(12) United States Patent
Benedict et al.

(10) Patent No.: US 9,851,128 B2
(45) Date of Patent: Dec. 26, 2017

(54) MAGNETO CALORIC HEAT PUMP

(71) Applicant: General Electric Company, Schenectady, NY (US)

(72) Inventors: Michael Alexander Benedict, Louisville, KY (US); David G. Beers, Elizabeth, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 638 days.

(21) Appl. No.: 14/258,112

(22) Filed: Apr. 22, 2014

(65) Prior Publication Data

US 2015/0300704 A1    Oct. 22, 2015

(51) Int. Cl.
*F25B 21/00* (2006.01)
*H01F 7/02* (2006.01)
*F25B 25/00* (2006.01)
*F25B 9/00* (2006.01)

(52) U.S. Cl.
CPC ...... *F25B 21/00* (2013.01); *F25B 2321/0021* (2013.01); *Y02B 30/66* (2013.01)

(58) Field of Classification Search
CPC ...... F25B 2321/0021; F25B 2321/0023; F25B 21/00; F25B 2321/00; F25B 2321/002; F25B 2321/0022; F25B 9/00; F25B 25/00; Y02B 30/66; H01F 7/021; H01F 7/0247; H01F 7/0273; H01F 38/02; H01F 38/023; H01F 38/026
USPC .......................................................... 62/3.1
See application file for complete search history.

(56) References Cited

U.S. PATENT DOCUMENTS

| 668,560 | A | 2/1901 | Fulner et al. |
| 4,107,935 | A | 8/1978 | Steyert, Jr. |
| 4,507,927 | A | 4/1985 | Barclay |
| 4,549,155 | A | 10/1985 | Halbach |

(Continued)

FOREIGN PATENT DOCUMENTS

| CA | 2893874 A1 | 6/2014 |
| CA | 2919117 A1 | 1/2015 |

(Continued)

OTHER PUBLICATIONS

International Search Report and Written Opinion issued in connection with PCT Application No. PCT/US2014/042485 dated Oct. 31, 2014.

(Continued)

*Primary Examiner* — Frantz Jules
*Assistant Examiner* — Erik Mendoza-Wilkenfel
(74) *Attorney, Agent, or Firm* — Dority & Manning, P.A.

(57) ABSTRACT

A heat pump system is provided that uses MCM to provide for heating or cooling. The heat pump is constructed from a continuously rotating regenerator where MCM is cycled in and out of a magnetic field in a continuous manner. A heat transfer fluid is circulated therethrough to provide for heat transfer in a cyclic manner. The MCM may include stages having different Curie temperature ranges. A field of varying magnetic flux may be used. The rotating regenerator can be equipped with one or more gaskets to improve fluid seals between the rotating regenerator and stationary parts. An appliance using such a heat pump system is also provided. The heat pump may also be used in other applications for heating, cooling, or both.

18 Claims, 8 Drawing Sheets

(56) References Cited

U.S. PATENT DOCUMENTS

| | | | |
|---|---|---|---|
| 4,625,519 | A | 12/1986 | Hakuraku et al. |
| 4,642,994 | A | 2/1987 | Barclay et al. |
| 5,091,361 | A | 2/1992 | Hed |
| 5,156,003 | A | 10/1992 | Yoshiro et al. |
| 5,213,630 | A * | 5/1993 | Hashimoto .............. C09K 5/16 148/301 |
| 5,249,424 | A | 10/1993 | DeGregoria et al. |
| 5,934,078 | A * | 8/1999 | Lawton, Jr. ............ F25B 21/00 62/3.1 |
| 6,332,323 | B1 | 12/2001 | Reid et al. |
| 6,446,441 | B1 | 9/2002 | Dean |
| 6,588,215 | B1 | 7/2003 | Ghoshal |
| 6,668,560 | B2 | 12/2003 | Zimm et al. |
| 6,676,772 | B2 * | 1/2004 | Saito ....................... H01F 1/015 148/301 |
| 6,935,121 | B2 | 8/2005 | Fang et al. |
| 7,313,926 | B2 | 1/2008 | Gurin |
| 7,481,064 | B2 | 1/2009 | Kitanovski |
| 7,552,592 | B2 | 6/2009 | Iwasaki et al. |
| 7,644,588 | B2 | 1/2010 | Shin |
| 7,897,898 | B2 | 3/2011 | Muller et al. |
| 8,099,964 | B2 | 1/2012 | Saito et al. |
| 8,174,245 | B2 | 5/2012 | Carver |
| 8,209,988 | B2 * | 7/2012 | Zhang .................... F25B 21/00 62/3.1 |
| 8,375,727 | B2 | 2/2013 | Sohn |
| 8,378,769 | B2 | 2/2013 | Heitzler et al. |
| 8,448,453 | B2 | 5/2013 | Bahl et al. |
| 8,551,210 | B2 | 10/2013 | Reppel et al. |
| 8,596,084 | B2 | 12/2013 | Herrera |
| 8,616,009 | B2 | 12/2013 | Dinesen |
| 8,656,725 | B2 | 2/2014 | Muller et al. |
| 8,695,354 | B2 | 4/2014 | Heitzler et al. |
| 8,729,718 | B2 | 5/2014 | Kuo et al. |
| 8,769,966 | B2 | 7/2014 | Heitzler et al. |
| 8,869,541 | B2 | 10/2014 | Heitzler et al. |
| 8,935,927 | B2 | 1/2015 | Kobayashi et al. |
| 9,245,673 | B2 | 1/2016 | Carroll et al. |
| 9,377,221 | B2 | 6/2016 | Benedict |
| 2002/0053209 | A1 * | 5/2002 | Zimm ..................... F25B 21/00 62/3.1 |
| 2003/0051774 | A1 | 3/2003 | Saito |
| 2004/0093877 | A1 | 5/2004 | Wada |
| 2004/0250550 | A1 | 12/2004 | Bruck |
| 2006/0231163 | A1 | 10/2006 | Hirosawa |
| 2008/0236171 | A1 | 10/2008 | Saito et al. |
| 2009/0158749 | A1 | 6/2009 | Sandeman |
| 2010/0000228 | A1 | 1/2010 | Wiest |
| 2010/0071383 | A1 | 3/2010 | Zhang |
| 2010/0236258 | A1 | 9/2010 | Heitzler et al. |
| 2011/0042608 | A1 | 2/2011 | Reesink |
| 2011/0048690 | A1 | 3/2011 | Reppel |
| 2011/0162388 | A1 | 7/2011 | Barve et al. |
| 2011/0168363 | A9 | 7/2011 | Reppel |
| 2011/0173993 | A1 | 7/2011 | Muller et al. |
| 2011/0182086 | A1 | 7/2011 | Mienko et al. |
| 2011/0192836 | A1 | 8/2011 | Muller et al. |
| 2011/0239662 | A1 | 10/2011 | Bahl et al. |
| 2011/0308258 | A1 * | 12/2011 | Smith ..................... F25B 21/00 62/3.1 |
| 2012/0033002 | A1 | 2/2012 | Seeler et al. |
| 2012/0045698 | A1 | 2/2012 | Shima |
| 2012/0079834 | A1 | 4/2012 | Dinesen |
| 2012/0222427 | A1 | 9/2012 | Hassen |
| 2012/0222428 | A1 | 9/2012 | Celik |
| 2012/0267090 | A1 | 10/2012 | Kruglick |
| 2012/0272666 | A1 | 11/2012 | Watanabe |
| 2012/0285179 | A1 * | 11/2012 | Morimoto .............. F25B 21/00 62/3.1 |
| 2013/0019610 | A1 | 1/2013 | Zimm et al. |
| 2013/0148301 | A1 * | 6/2013 | Dede ...................... F25B 21/00 62/3.1 |
| 2013/0187077 | A1 | 7/2013 | Katter |
| 2013/0192269 | A1 | 8/2013 | Wang |
| 2013/0232993 | A1 | 9/2013 | Saito et al. |
| 2013/0269367 | A1 | 10/2013 | Meillan |
| 2014/0020881 | A1 | 1/2014 | Reppel |
| 2014/0165594 | A1 | 6/2014 | Benedict |
| 2014/0165595 | A1 | 6/2014 | Zimm et al. |
| 2014/0190182 | A1 | 7/2014 | Benedict |
| 2014/0216057 | A1 | 8/2014 | Oezcan |
| 2014/0290273 | A1 | 10/2014 | Benedict et al. |
| 2014/0291570 | A1 | 10/2014 | Klausner |
| 2014/0325996 | A1 | 11/2014 | Muller |
| 2015/0027133 | A1 | 1/2015 | Benedict |
| 2015/0033762 | A1 | 2/2015 | Cheng |
| 2015/0033763 | A1 | 2/2015 | Saito |
| 2015/0047371 | A1 | 2/2015 | Hu et al. |
| 2015/0068219 | A1 | 3/2015 | Komorowski |
| 2015/0168030 | A1 | 6/2015 | Leonard et al. |
| 2015/0260433 | A1 | 9/2015 | Choi |
| 2015/0362225 | A1 | 12/2015 | Schwartz |
| 2016/0355898 | A1 | 12/2016 | Vieyra |
| 2017/0071234 | A1 | 3/2017 | Garg |

FOREIGN PATENT DOCUMENTS

| | | | |
|---|---|---|---|
| CN | 101979937 | | 10/2010 |
| CN | 101979937 | | 2/2011 |
| CN | 202432596 | U | 9/2012 |
| CN | 103090583 | A | 10/2014 |
| CN | 102077303 | B | 4/2015 |
| DE | 102013223959 | A1 | 5/2015 |
| EP | 2071255 | A1 | 6/2009 |
| EP | 2108904 | A1 | 10/2009 |
| FR | 2710779 | A1 * | 4/1995 ............ B60L 11/005 |
| JP | S59232922 | | 12/1984 |
| JP | 2002315243 | A | 10/2002 |
| JP | 2007147136 | | 6/2007 |
| JP | 2007/291437 | A | 11/2007 |
| JP | 2007291437 | A | 11/2007 |
| JP | 2008051412 | | 3/2008 |
| JP | 2010112606 | A | 5/2010 |
| KR | 101100301 | B1 | 12/2011 |
| KR | 1238234 | B1 | 3/2013 |
| WO | 02/12800 | | 2/2002 |
| WO | WO 03016794 | | 2/2003 |
| WO | WO2004/068512 | | 8/2004 |
| WO | WO2007/036729 | A1 | 4/2007 |
| WO | WO2009/024412 | | 2/2009 |
| WO | WO 2011/034594 | A1 | 3/2011 |
| WO | WO2014173787 | A1 | 10/2014 |

OTHER PUBLICATIONS

International Search Report and Written Opinion issued in connection with PCT Application No. PCT/US2014/017431 dated May 16, 2014.

International search report issued in connection with PCT/US2013/070518, dated Jan. 30, 2014.

Tetsuji Okamura, Performance of room-temperature rotary magnet refigerator, Nov. 28, 2005, Elsevier.

Journal of Alloys and Compounds, copyright 2008 Elsevier B.. V.. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct Scripta Materialia 63 (2010).

PCT International Search Report dated Mar. 6, 2014.

Barbara Pulkp, Epoxy-bonded La—Fe—Co—Si magnetocaloric plates, Journal of Magnetism and Magnetic Materials, 375 (2015) 65-73.

* cited by examiner

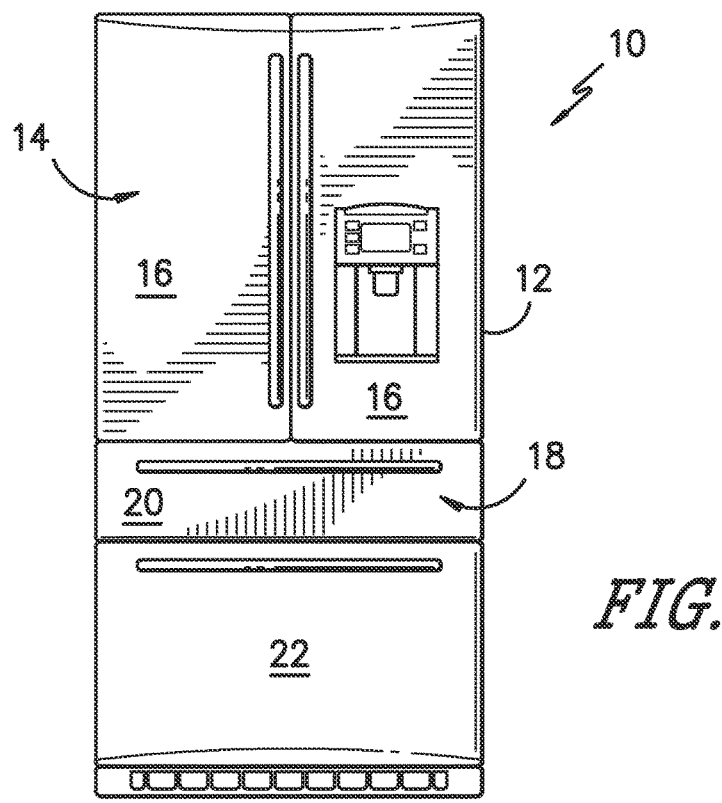
FIG. -1-
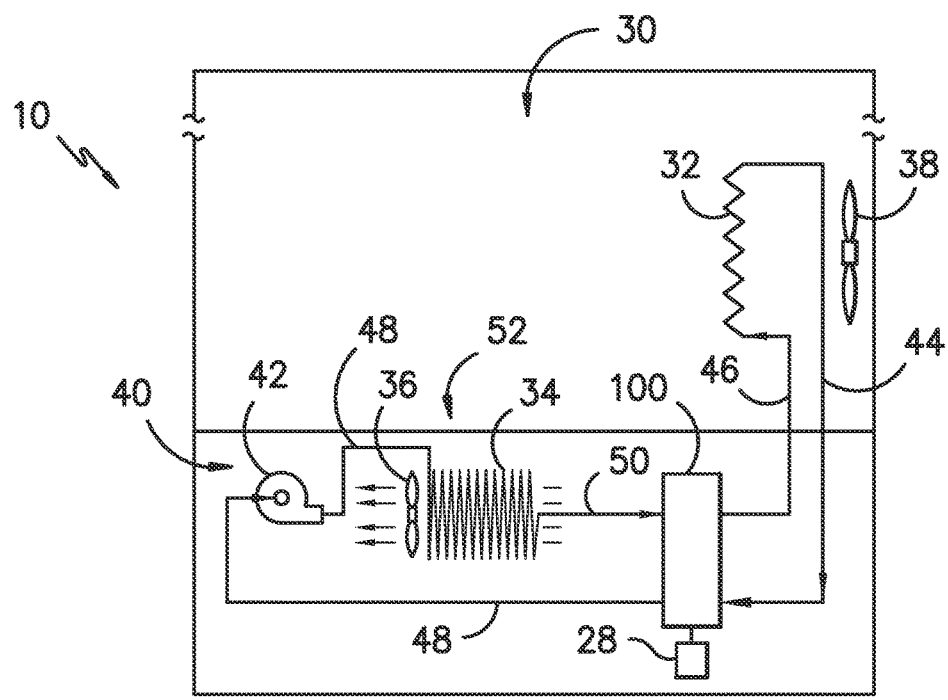
FIG. -2-

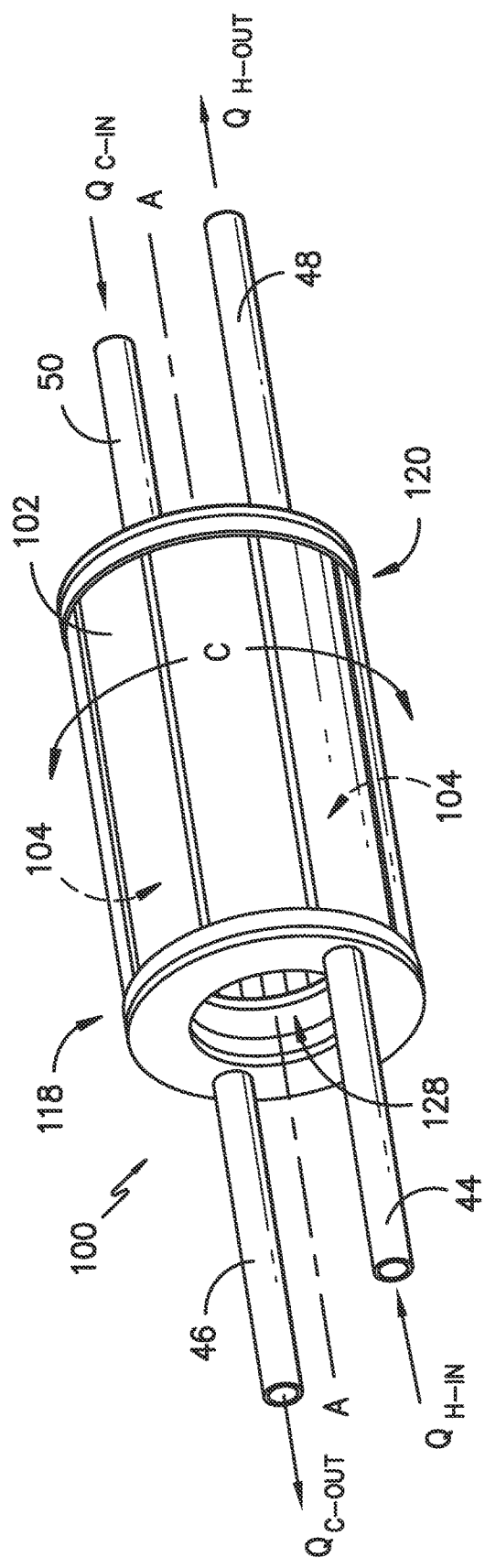
FIG. -3-

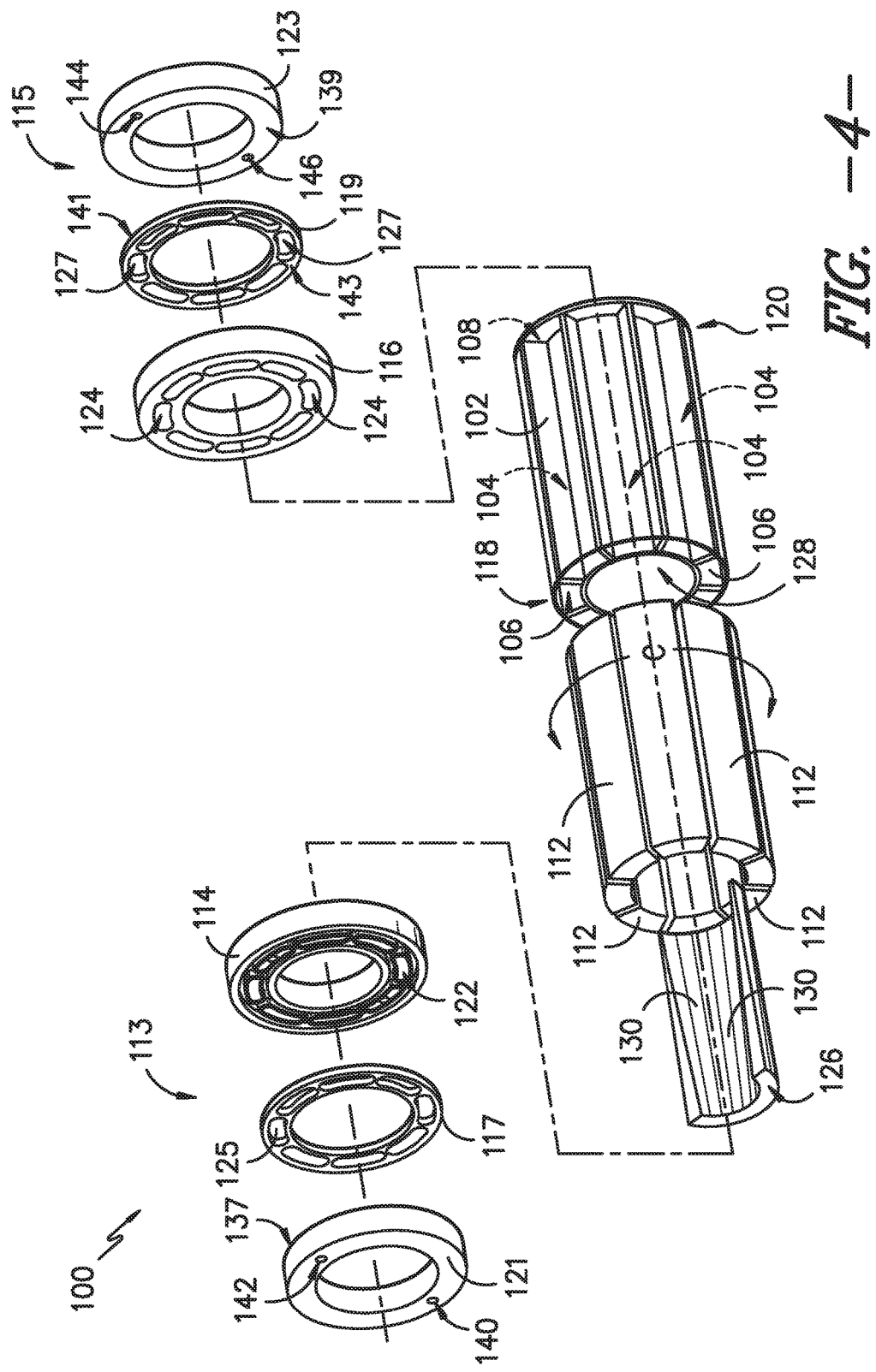
FIG. -4-

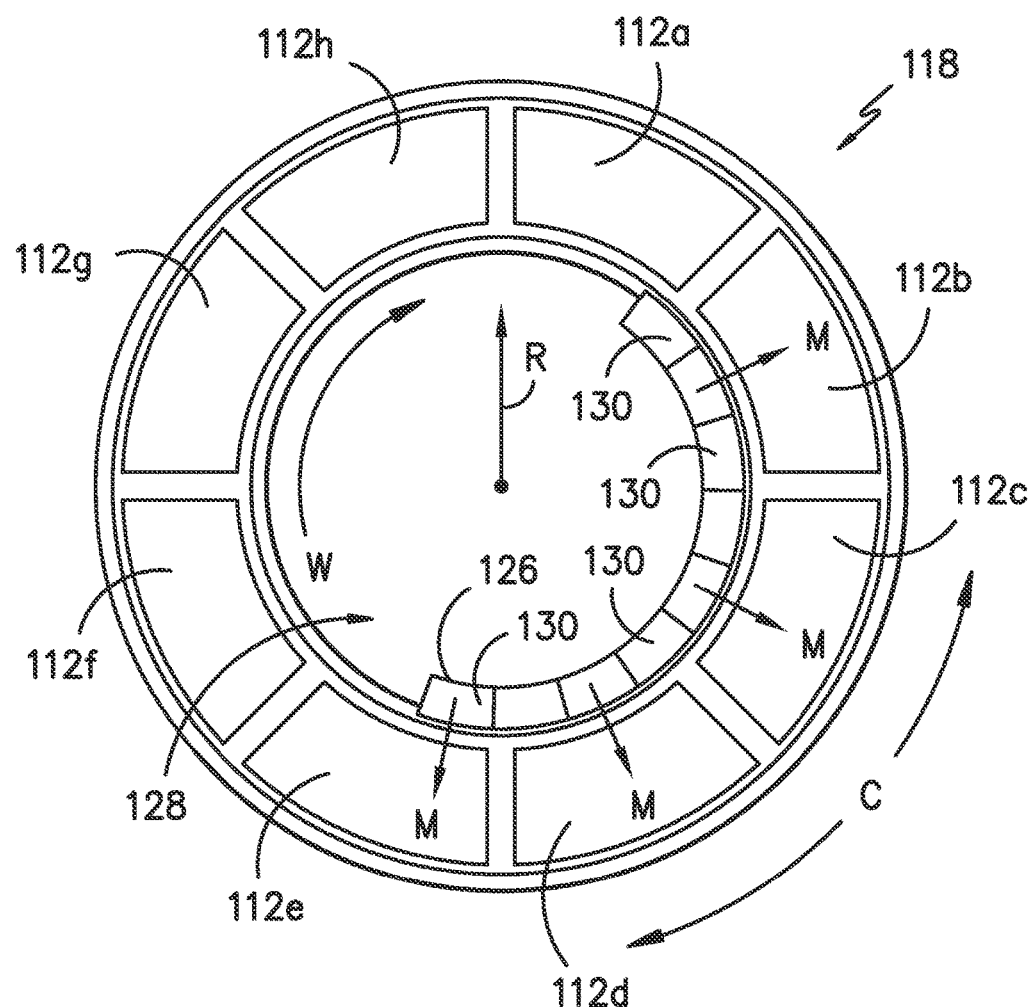
FIG. -5-

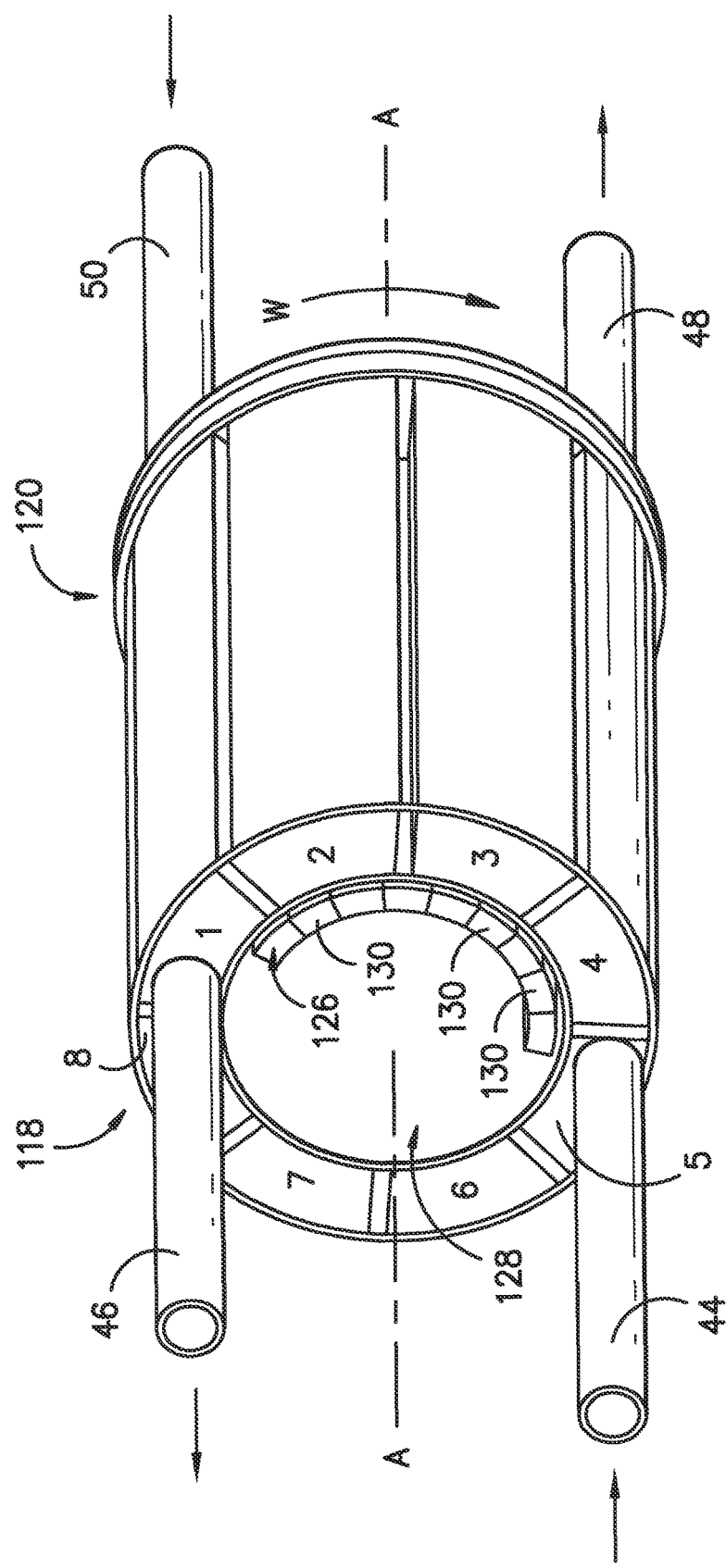
FIG. -6-

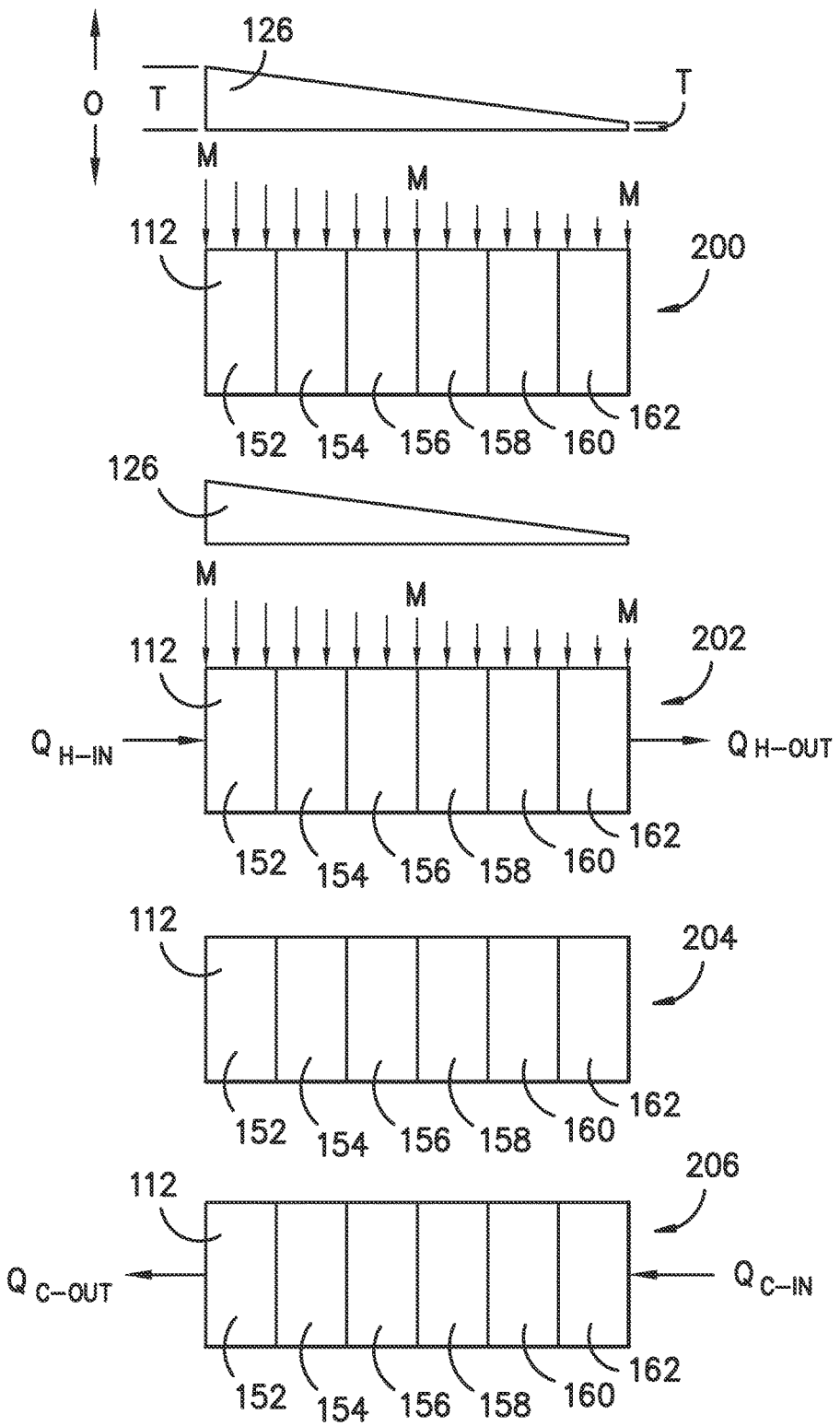
FIG. -7-

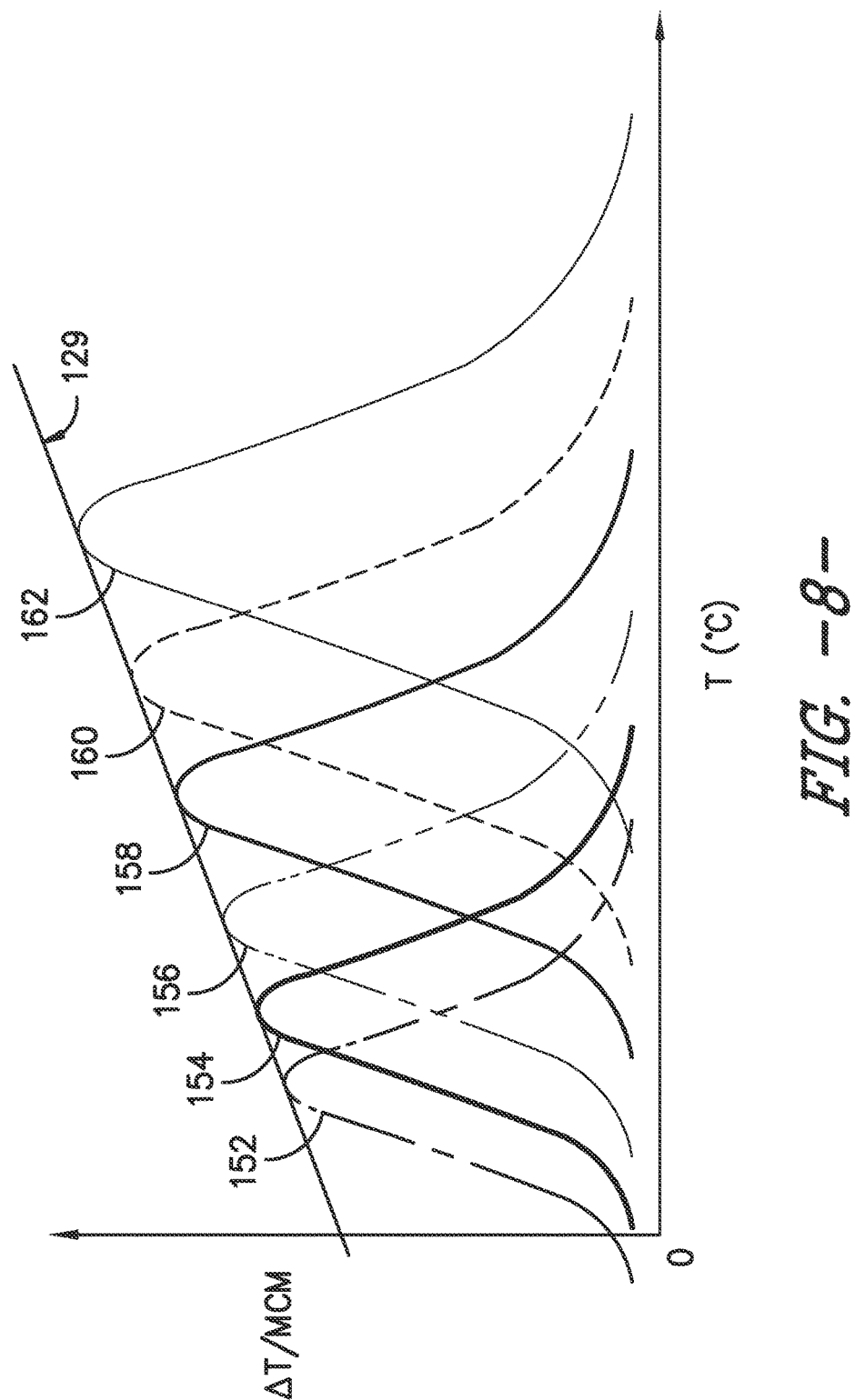
FIG. -8-

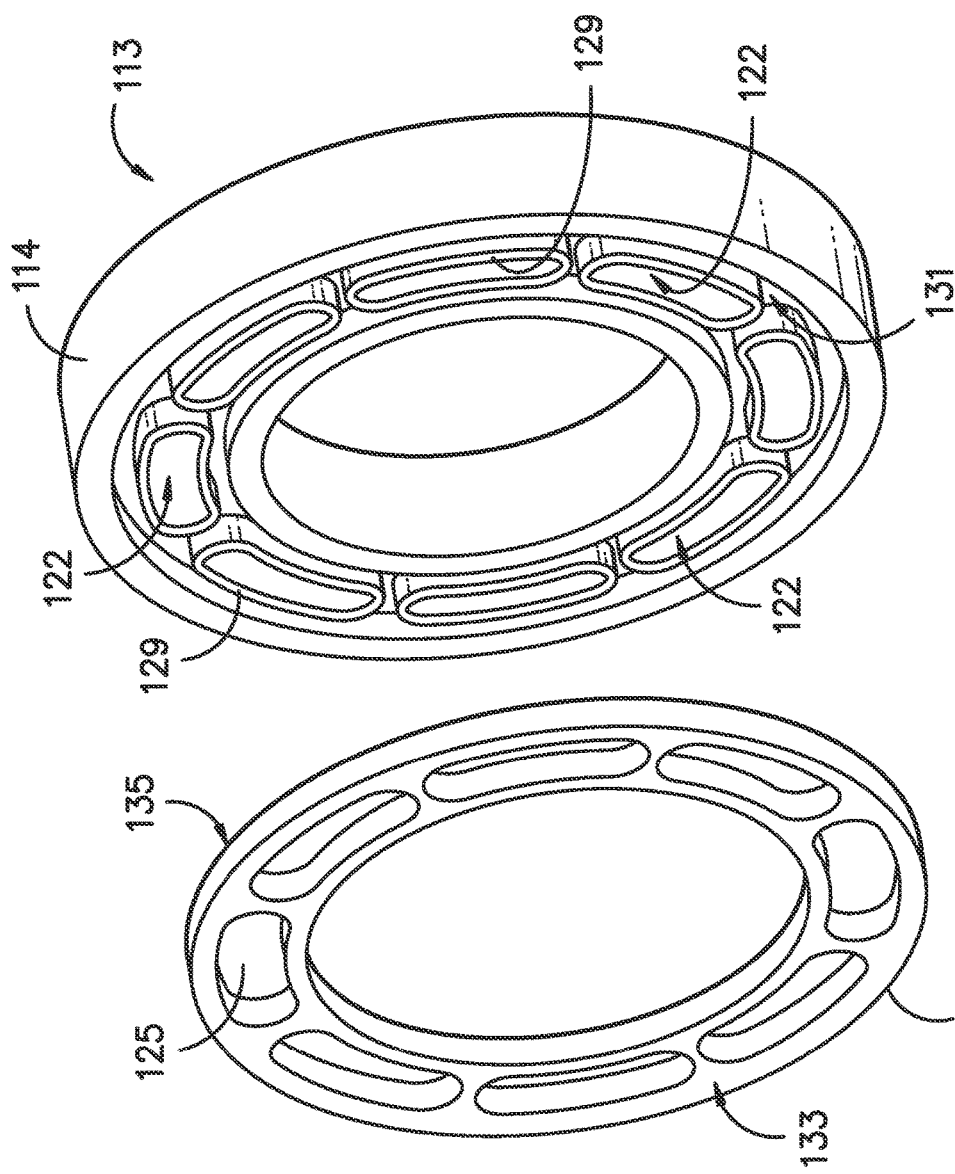
FIG. -9-

MAGNETO CALORIC HEAT PUMP

FIELD OF THE INVENTION

The subject matter of the present disclosure relates generally to a heat pump that uses magneto caloric materials to provide for heat transfer.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with a heat pump in such systems.

Certain challenges exist with these conventional heat pump systems. While improvements have been made, at best heat pump systems that rely on the compression of fluid refrigerant can still only operate at about 45 percent or less of the maximum theoretical Carnot cycle efficiency. Also, some fluid refrigerants have been discontinued due to environmental concerns. The range of ambient temperatures over which certain such refrigerant-based systems can operate may be impractical for certain locations. Other challenges with heat pumps that use a fluid refrigerant exist as well.

Magneto caloric materials (MCMs)—i.e. materials that exhibit the magneto caloric effect—provide a potential alternative to fluid refrigerants for heat pump applications. In general, the magnetic moments of a normal MCM will become more ordered under an increasing, externally applied magnetic field and cause the MCM to generate heat, Conversely, decreasing the externally applied magnetic field will allow the magnetic moments of the MCM to become more disordered and allow the MCM to absorb heat. Some MCMs exhibit the opposite behavior i.e. generating heat when a magnetic field is removed and becoming cooler when placed into the magnetic field. This latter type can be referred to as inverse or para-magneto caloric material. Both normal and inverse MCM are referred to collectively herein as magneto caloric material or MCM. The theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. In certain constructions, one or more magnets are used to create the magnetic field that causes the MCM to exhibit the magneto caloric effect. Although necessary, such magnets contribute substantially to the overall costs of a heat pump that uses an MCM.

Additionally, as stated above, the ambient conditions under which a heat pump may be needed can vary substantially. For example, for a refrigerator appliance placed in a garage or located in a non-air conditioned space, ambient temperatures can range from below freezing to over 90° F. Some MCMs are capable of accepting and generating heat only within a much narrower temperature range than presented by such ambient conditions. Also, different MCMs may exhibit the magneto caloric effect more prominently at different temperatures.

Accordingly, a heat pump system that can address certain challenges including those identified above would be useful. Such a heat pump system that can also be used in e.g., a refrigerator appliance and other applications as well would also be useful.

BRIEF DESCRIPTION OF THE INVENTION

The present invention provides a heat pump system that uses MCM to provide for heating or cooling. The heat pump is constructed from a continuously rotating regenerator where MCM is cycled in and out of a magnetic field in a continuous manner. A heat transfer fluid is circulated therethrough to provide for heat transfer in a cyclic manner. The MCM may include stages having different Curie temperature ranges. A field of varying magnetic flux may be used. The rotating regenerator can be equipped with one or more gaskets to improve fluid seals between the rotating regenerator and stationary parts. An appliance using such a heat pump system is also provided. The heat pump may also be used in other applications for heating, cooling, or both. Additional aspects and advantages of the invention will be set forth in part in the following description, or may be apparent from the description, or may be learned through practice of the invention.

In one exemplary embodiment, the present invention provides a heat pump system. The system includes a regenerator housing defining a circumferential direction and rotatable about an axial direction, the axial direction extending between a first end and a second end of the regenerator housing. The regenerator housing includes a plurality of chambers with each chamber extending longitudinally along the axial direction between a pair of openings, the plurality of chambers arranged proximate to each other along the circumferential direction. The system also includes a plurality of working units, each working unit positioned within one of the plurality of chambers and extending along the axial direction, each working unit including a plurality of stages arranged sequentially along the axial direction.

A magnetic device is positioned proximate to the regenerator housing and extends along the axial direction. The magnetic device creates a field of magnetic flux and is positioned so that one or more of the plurality of working units are moved in and out of the magnetic field as the regenerator housing is rotated about the axial direction.

This exemplary heat pump system includes a pair of rotatable plates including a first rotatable plate attached to the first end of the regenerator housing and second rotatable plate attached to the second end of the regenerator housing. The first and second rotatable plates each include a plurality of apertures spaced apart from each other along the circumferential direction with each aperture positioned adjacent to one of the pair of openings of one of the plurality of chambers. A pair of fixed plates includes a first fixed plate positioned proximate to the first rotatable plate and a second fixed plate positioned proximate to the second rotatable plate such that the regenerator housing and the pair of rotatable valves are rotatable relative to the pair of fixed plates. The first and second fixed plates each include a plurality of ports including one or more pairs positioned in an opposing manner relative to each other and also positioned so that each port can selectively align with at least one of the pair of openings of the plurality of chambers as the regenerator housing is rotated about the axial direction.

A pair of gaskets are providing that includes a first gasket positioned between the first fixed plate and the first rotatable plate and a second gasket positioned between the second fixed plate and the second rotatable plate. The pair of gaskets are configured for providing fluid seals between the pair of rotatable plates and the pair of non-rotatable plates.

In another exemplary embodiment, the present invention provides a heat pump system. The system includes a regenerator housing defining a circumferential direction and rotatable about an axial direction, the axial direction extending longitudinally between a first end and a second end of the regenerator housing, the regenerator having one or more openings for fluid flow at each end of the housing. A plurality of working units are positioned within the regenerator housing and extend along the axial direction. The working units are positioned adjacent to each other along the circumferential direction with each working unit comprising a plurality of stages arranged sequentially along the axial direction.

A magnetic device is positioned proximate to the regenerator housing and extends along the axial direction. The magnetic device creates a field of magnetic flux. The magnetic device is positioned so that one or more of the plurality of working units are moved in and out of the magnetic field as the regenerator housing is rotated about the axial direction.

A pair of rotatable plates are provided that include a first rotatable plate attached to the first end of the regenerator housing and a second rotatable plate attached to the second end of the regenerator housing. The first and second rotatable plates each include a plurality of apertures spaced apart from each other along the circumferential direction with each aperture positioned adjacent to at least one of the openings at the ends of the regenerator housing so as to provide fluid communication.

For this exemplary embodiment, the system also includes a pair of fixed plates comprising a first fixed plate positioned proximate to the first rotatable plate and a second fixed plate positioned proximate to the second rotatable plate such that the regenerator housing and the pair of rotatable plates are rotatable relative to the pair of fixed plates. The first fixed plate and the second fixed plate each include a plurality of ports including one or more pairs positioned in an opposing manner relative to each other and also positioned so that each port can selectively align with at least one of the openings at the ends of the regenerator housing as it is rotated about the axial direction.

A pair of gaskets are included having a first gasket positioned between the first fixed plate and the first rotatable plate and a second gasket positioned between the second fixed plate and the second rotatable plate. The pair of gaskets are configured for providing fluid seals between the pair of rotatable plates and the pair of non-rotatable plates.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides an exemplary embodiment of a refrigerator appliance of the present invention.

FIG. 2 is a schematic illustration of an exemplary heat pump system of the present invention positioned in an exemplary refrigerator with a machinery compartment and at least one refrigerated compartment.

FIG. 3 provides a perspective view of an exemplary heat pump of the present invention.

FIG. 4 is an exploded view of the exemplary heat pump of FIG. 3.

FIG. 5 is a cross-sectional view of the exemplary heat pump of FIG. 3,

FIG. 6 is perspective view of the exemplary heat pump of FIG. 3. Valves located at the ends of a regenerator housing have been removed for purposes of further explanation of this exemplary embodiment of the invention as set forth below.

FIG. 7 is a schematic representation of various steps in the use of a stage of the heat pump of FIG. 3.

FIG. 8 is a plot of certain data regarding several stages of MCM as further described below.

FIG. 9 is an exploded, perspective view of an exemplary plate and gasket of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms.

Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Thus, it should be understood that while the use of a heat pump to provide cooling within a refrigerator is provided by way of example herein, the present invention may also be used in other applications to provide for heating and/or cooling as well.

FIG. 2 is a schematic view of another exemplary embodiment of a refrigerator appliance 10 including a refrigeration compartment 30 and a machinery compartment 40. In particular, machinery compartment 40 includes an exemplary heat pump system 52 of the present invention having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat associated with the magneto caloric effect provided by MCM in heat pump 100 and carries this heat by line 48 to pump 42 and then to second heat exchanger 34. Heat is released to the environment, machinery compartment 40, and/or another location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will be further described.

From second heat exchanger 34 the heat transfer fluid returns by line 50 to heat pump 100 where, as will be further described below, due to the magneto caloric effect, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well. Heat pump system 52 could also be configured with e.g., air-conditioning systems and other applications in addition to a refrigeration appliance.

FIGS. 3, 4, 5, and 6 depict various views of an exemplary heat pump 100 of the present invention. Heat pump 100 includes a regenerator housing 102 that extends longitudinally along an axial direction between a first end 118 and a second end 120. The axial direction is defined by axis A-A about which regenerator housing 102 rotates. A radial direction R is defined by a radius extending orthogonally from the axis of rotation A-A (FIG. 5). A circumferential direction is indicated by arrows C.

Regenerator housing 102 defines a plurality of chambers 104 that extend longitudinally along the axial direction defined by axis A-A. Chambers 104 are positioned proximate or adjacent to each other along circumferential direction C. Each chamber 104 includes a pair of openings 106 and 108 positioned at opposing ends 118 and 120 of regenerator housing 102 (FIG. 4).

For this exemplary embodiment, heat pump 100 also includes a plurality of working units 112 that each include MCM. Each working unit 112 is located in one of the chambers 104 and extends along axial direction A-A. For the exemplary embodiment shown in the figures, heat pump 100 includes eight working units 112 positioned adjacent to each other along the circumferential direction as shown and extending longitudinally along the axial direction A-A. As will be understood by one of skill in the art using the teachings disclosed herein, a different number of working units 112 other than eight may be used as well. For example, 2, 4, 6, 12, and other numbers of working units (and associated chambers) may also be used.

As will be understood using the teachings disclosed herein, the present invention is not limited to a regenerator housing 102 having the structure shown in FIG. 4. Instead, other configurations may be used for creating multiple working units 112. For example, regenerator housing 102 can be provided without chambers 104 for each working unit 112. In such an embodiment, the working units 112 would be defined by the MCM. For example, the working units 112 could be partitioned along circumferential direction C by multiple spaces dividing the MCM into working units 11-2 instead of being partitioned by the walls defining chambers 104. In still another embodiment, MCM could be provided having channels, grooves, or other features dividing the MCM along the circumferential direction C into multiple working units. Other configurations where regenerator housing 102 does not include structure such as chambers 104 for partitioning the MCM into the various working units 112 could be used as well.

A pair of valves 113 and 115 are positioned at axial ends of regenerator housing 102 (FIG. 4). Together valves 113 and 115 include a pair of rotatable plates 114 and 116, a pair of fixed plates 121 and 123, and pair of gaskets 117 and 119. As will be further described, gaskets 117 and 119 are configured to provide fluids seals between the pair of rotatable plates 114, 116 and the pair of fixed plates 121, 123, respectively.

First rotatable plate 114 is attached to first end 118 and second rotatable plate 116 is attached to second end 120. As shown in FIG. 4 and FIG. 9 (only rotatable plate 114 is shown in FIG. 9—plate 116 would be substantially identical in construction), each rotatable plate 114 and 116 includes a plurality of openings or apertures 122 and 124, respectively. For this exemplary embodiment, apertures 122 and 124 are configured as circumferentially-extending slots that are spaced apart along circumferential direction C.

Using rotatable plate 114 by way of example, gasket 117 is received into a recess 131 defined by plate 114. A plurality of projections 129 extend from plate 114 along axial direction A-A towards fixed plate 121 and define apertures 122. Gasket 117 defines a plurality of channels 125 in which projections 129 are received. As such, channels 125 and projections 129 help secure the position of gasket 117 relative to rotatable plate 114 by preventing gasket 117 from rotating relative to plate 114 during operation of the heat pump. For this exemplary embodiment, the opposing faces 133 and 135 of gasket 117 contact fixed plate 121 and rotatable plate 114, respectively, to form a fluid tight seal therebetween. During operation, as regenerator housing 102 rotates about axis A-A, gasket 117 rotates with rotatable plate 114 and also slides over the inside face 137 (FIG. 4) of fixed plate 121 while maintaining the fluid seal, A similar construction and operation is used for fixed plate 123 with inside face 139, gasket 119 with opposing faces 141 and 143, and rotatable plate 116. The plurality of apertures 122 and 124 of the first and second rotatable plates 114 and 116 are aligned with the plurality of apertures 125 and 127 of the pair of gaskets 117 and 119 so as to provide fluid communication therebetween.

A variety of constructions may be used for gaskets 117 and 119. For example, gaskets 117,119 could be constructed from a homogenous material or could be constructed from layers and/or segments of different materials. Gaskets 117, 119 could be a unitary part as shown or could be formed from multiple parts. Also, gaskets 117 and 119 could be formed from one or more materials deposited, adhered, or layered onto e.g., plates 114,116. For example, gaskets 117 and 119 could be formed as coatings on plates 114, 116. Gaskets 117 and 119 could be formed from elastomeric or other pliable materials. Other constructions may be used as well.

Each aperture 122 is positioned adjacent to a respective opening 106 of a chamber 104. Each aperture 124 is positioned adjacent to a respective opening 108 of a chamber 104. Accordingly, a heat transfer fluid may flow into a chamber 104 through a respective aperture 122 and opening 106 so as to flow through the MCM in a respective working unit 112 and then exit through opening 108 and aperture 124. A reverse path can be used for flow of the heat transfer fluid in the opposite direction through the working unit 112 of a given chamber 104.

Referring to FIG. 4, first fixed plate 121 has a first inlet port 140 and a first outlet port 142 and is positioned adjacent to rotatable plate 114. As shown, ports 140 and 142 are positioned 180 degrees apart about the circumferential direction C of first fixed plate 121. However, other configurations may be used. For example, ports 140 and 142 may be positioned within a range of about 170 degrees to about 190 degrees about the circumferential direction C as well. Rotatable plate 114 and regenerator housing 102 are rotatable relative to first fixed plate 121. Ports 140 and 142 are connected with lines 44 and 46 (FIG. 1), respectively. As such, the rotation of regenerator housing 102 about axis A-A sequentially places lines 44 and 46 in fluid communication with at least two working units 112 of MCM at any one time as will be further described.

Second fixed plate 123 has a second inlet port 144 and a second outlet port 146 and is positioned adjacent to second rotatable plate 116. As shown, ports 144 and 146 are positioned 180 degrees apart about the circumferential direction C of second fixed plate 123. However, other configurations may be used. For example, ports 144 and 146 may be positioned within a range of about 170 degrees to about 190 degrees about the circumferential direction C as well. Second rotatable plate 116 and regenerator housing 102 are rotatable relative to second fixed plate 123. Ports 144 and 146 are connected with lines 50 and 48 (FIG. 1), respectively. As such, the rotation of regenerator housing 102 about axis A-A sequentially places lines 48 and 50 in fluid communication with at least two working units 112 of MCM at any one time as will be further described. Notably, at any one time during rotation of regenerator housing 102, lines 46 and 50 will each be in fluid communication with at least one working unit 112 while lines 44 and 48 will also be in fluid communication with at least one other working unit 112 located about 180 degrees away along the circumferential direction.

As shown in FIGS. 4, 5, and 6, regenerator housing 102 defines a cavity 128 that is positioned radially inward of the plurality of chambers 104 and extends along the axial direction between first end 118 and second end 120. A magnetic device 126 is positioned within cavity 128 and, for this exemplary embodiment, extends along the axial direction between first end 118 and second end 120. Magnetic device 126 provides a magnetic field M that is directed radially outward as indicated by arrows M in FIG. 5.

The positioning and configuration of magnetic device 126 is such that only a subset (e.g., one, two, or more) of the plurality of working units 112 is/are within or subjected to magnetic field M at any one time. For example, as shown in FIG. 5, working units 112a and 112e are partially within the magnetic field while units 112b, 112c, and 112d are fully within the magnetic field M created by magnetic device 126. Conversely, the magnetic device 126 is configured and positioned so that working units 112f, 112g, and 112h are completely or substantially out of the magnetic field created by magnetic device 126. However, as regenerator housing 102 is continuously rotated along circumferential direction C as shown by arrow W, the subset of working units 112 within the magnetic field will continuously change as some working units 112 will enter magnetic field M and others will exit.

FIG. 7 illustrates an exemplary method of the present invention using a schematic representation of a working unit 112 of MCM in regenerator housing 102 as it rotates in the direction of arrow W between positions 1 through 8 as shown in FIG. 6. During step 200, working unit 112 is fully within magnetic field M, which causes the magnetic moments of the material to orient and the MCM to heat (when a normal MCM is used) as part of the magneto caloric effect. Ordering of the magnetic field is created and maintained as working unit 112 is rotated sequentially through positions 2, 3, and then 4 (FIG. 6) as regenerator housing 102 is rotated in the direction of arrow W. During the time at positions 2, 3, and 4, the heat transfer fluid dwells in the MCM of working unit 112 and, therefore, is heated. More specifically, the heat transfer fluid does not flow through working unit 112 because the openings 106, 108 and apertures 122, 124 corresponding to working unit 112 in positions 2, 3, and 4 are not aligned with any of the ports 140, 142, 144, or 146.

In step 202, as regenerator housing 102 continues to rotate in the direction of arrow W, working unit 112 will eventually reach position 5. As shown in FIGS. 3 and 6, at position 5 the heat transfer fluid can flow through the MCM as first inlet port 140 is now aligned with an aperture 122 in first rotatable plate 114 and an opening 106 at the first end 118 of working unit 112 while second outlet port 146 is aligned with an aperture 124 in second rotatable plate 116 at the second end 120 of working unit 112.

As indicated by arrow $Q_{H-OUT}$ in FIGS. 3 and 7, heat transfer fluid in working unit 112, now heated by the MCM, can travel out of regenerator housing 102 and along line 48 to the second heat exchanger 34. At the same time, and as indicated by arrow Qtr-IN, heat transfer fluid from first heat exchanger 32 flows into working unit 112 from line 44 when working unit 112 is at position 5. Because heat transfer fluid from the first heat exchanger 32 is relatively cooler than the MCM in working unit 112, the MCM will lose heat to the heat transfer fluid.

Referring again to FIG. 7 and step 204, as regenerator housing 102 continues to rotate in the direction of arrow W, working unit 112 is moved sequentially through positions 6, 7, and 8 where working unit 112 is completely or substantially out of magnetic field M. The absence or lessening of the magnetic field is such that the magnetic moments of the MCM become disordered and the MCM absorbs heat as part of the magneto caloric effect for a normal MCM. During the time in positions 6, 7, and 8, the heat transfer fluid dwells in the MCM of working unit 112 and, therefore, is cooled by losing heat to the MCM as the magnetic moments disorder. More specifically, the heat transfer fluid does not flow through working unit 112 because the openings 106, 108 and apertures 122, 124 corresponding to working unit 112 when in positions 6, 7, and 8 are not aligned with any of the ports 140, 142, 144, or 146.

Referring to step 206 of FIG. 7, as regenerator housing 102 continues to rotate in the direction of arrow W, working unit 112 will eventually reach position 1. As shown in FIGS. 3 and 6, at position 1 the heat transfer fluid in working unit 112 can flow through the MCM as second inlet port 144 is now aligned with an aperture 124 in second valve 116 and an opening 108 at the second end 120 while first outlet port 142 is aligned with an aperture 122 in first valve 114 and opening 106 at first end 118. As indicated by arrow $Q_{C\text{-}OUT}$ in FIGS. 3 and 7, heat transfer fluid in working unit 112, now cooled by the MCM, can travel out of regenerator housing 102 and along line 46 to the first heat exchanger 32. At the same time, and as indicated by arrow $Q_{C\text{-}IN}$, heat transfer fluid from second heat exchanger 34 flows into working unit 112 from line 50 when working unit 112 is at position 5. Because heat transfer fluid from the second heat exchanger 34 is relatively warmer than the MCM in working unit 112 at position 5, the heat transfer fluid will lose some of its heat to the MCM. The heat transfer fluid now travels along line 46 to the first heat exchanger 32 to receive heat and cool the refrigeration compartment 30.

As regenerator housing 102 is rotated continuously, the above described process of placing each working unit 112 in and out of magnetic field M is repeated. Additionally, the size of magnetic field M and regenerator housing 102 are such that a subset of the plurality of working units 112 is within the magnetic field at any given time during rotation. Similarly, a subset of the plurality of working units 112 are outside (or substantially outside) of the magnetic field at any given time during rotation. At any given time, there are at least two working units 112 through which the heat transfer fluid is flowing while the other working units 112 remain in a dwell mode. More specifically, while one working unit 112 is losing heat through the flow of heat transfer fluid at position 5, another working unit 112 is receiving heat from the flowing heat transfer fluid at position 1, while all remaining working units 112 are in dwell mode. As such, the system can be operated continuously to provide a continuous recirculation of heat transfer fluid in heat pump system 52 as working units 112 are each sequentially rotated through positions 1 through 8.

As will be understood by one of skill in the art using the teachings disclosed herein, the number of working units for housing 102, the number of ports in valve 114 and 116, and/or other parameters can be varied to provide different configurations of heat pump 100 while still providing for continuous operation. For example, each valve could be provided within two inlet ports and two outlet ports so that heal transfer fluid flows through at least four working units 112 at any particular point in time. Alternatively, regenerator housing 102, valves 122 and 124, and/or seals 136 and 138 could be constructed so that e.g., at least two working units are in fluid communication with an inlet port and outlet port at any one time. Other configurations may be used as well.

As stated, working unit 112 includes MCM extending along the axial direction of flow. The MCM may be constructed from a single MCM or may include multiple different MCMs having e.g., different temperature ranges over which each MCM exhibits the magneto caloric effect. By way of example, appliance 10 may be used in an application where the ambient temperature changes over a substantial range. However, a specific MCM may exhibit the magneto caloric effect over only a much narrower temperature range. As such, it may be desirable to use a variety of MCMs within a given working unit to accommodate the wide range of ambient temperatures over which appliance 10 and/or heat pump 100 may be used.

Accordingly, as shown in FIG. 7, each working unit 112 can be provided with stages 152, 154, 156, 158, 160, and 162 of different MCMs that are arranged sequentially along a predetermined direction—e.g., along axial direction A-A in this exemplary embodiment. Each such stage includes an MCM that exhibits the magneto caloric effect at a different temperature or a different temperature range than an adjacent stage along the axial direction A-A. The range of temperature over which the MCM (normal or inverse) in each stage exhibits the desired magneto caloric response to provide heating or cooling is referred to herein as the "Curie temperature range."

The stages can be arranged to that e.g., the Curie temperature ranges of the plurality of stages increases along a predetermined direction such as axial direction A-A. For example, stage 152 may exhibit the magnet caloric effect at a temperature less than the temperature at which stage 154 exhibits the magnet caloric effect, which may be less than such temperature for stage 156, and so on. Other configurations may be used as well. By configuring the appropriate number and sequence of stages of MCM, heat pump 100 can be operated over a substantial range of ambient temperatures.

In one exemplary embodiment, the Curie temperature ranges of stages 152, 154, 156, 158, 160, and 162 are also selected to overlap in order to facilitate heat transfer along direction HT. For example, in the embodiment shown in FIG. 7, stage 162 could have a Curie temperature range of 20° C. to 10° C.; stage 160 could have a Curie temperature range of 17.5° C. to 7.5° C.; stage 158 could have a Curie temperature range of 15° C. to 5° C.; stage 156 could have a Curie temperature range of 12.5° C. to 2.5° C.; stage 154 could have a Curie temperature range of 10° C. to 0° C.; and stage 152 could have a Curie temperature ranges of 5° C. to −2° C. These ranges are provided as examples; other Curie temperature ranges may be used as well in still other exemplary embodiments of the invention.

At stated, different types or e.g., alloys of MCMs can have different Curie temperature ranges over Which the MCM will substantially exhibit a magneto caloric effect. In addition, the magnitude of the magneto caloric effect can also be different for different MCMs. For example, FIG. 8 provides a plot of the amount of temperature change per a unit of material of different MCMs ($\Delta T$/MCM) as a function of operating temperature T. As shown, for these particular MCMs, the amount of temperature change each stage of MCM can provide decreases as the temperature decreases. Also, the amount of the magneto caloric effect that can be obtained from a given stage is also dependent upon the strength—i.e., the amount of magnetic flux—of the magnetic field that is applied to the MCM. With a given MCM, for example, the magnitude of the magneto caloric effect will be less as the magnitude of the magnetic flux decreases.

During operation of a heat pump 100 having stages 152, 154, 156, 158, 160, and 162 as shown in FIG. 8, the stages having a higher Curie temperature range become less important as e.g., cooling takes place and the compartments of the refrigerator approach 0° C. As the temperature is lowered, the stages having lower Curie temperature ranges (e.g., stages 152 and 154) provide the cooling required to maintain the desired temperature. However, because the stages having a higher Curie temperature range (e.g., 160 and 162) are still being subjected to the field of changing magnetic flux provided by magnetic device 126 as previously described, heat pump 100 is still consuming the power needed to cycle these stages.

Accordingly, as shown in FIG. 7, magnetic device 126 is positioned adjacent to the plurality of stages 152, 154, 156, 158, 160, and 162 and is configured to subject those stages to a magnetic field M of decreasing flux along a predetermined direction, which for this example is along axial direction A-A. As shown by arrows M in FIG. 7, the magnetic flux decreases as the Curie temperature range associated with each stage 152 through 162 increases. For this exemplary embodiment, magnetic device 126 can be constructed from one or more magnets. Magnet(s) 126 have a thickness T along a direction O that is orthogonal to the predetermined direction—i.e. axial direction A-A. Moving along axial direction A-A, the thickness T of magnet(s) 126 decreases so that the corresponding magnetic flux is also decreased along axial direction A, Other constructions can also be used to provide for a decrease in magnetic flux. For example, magnetic device 126 may be configured as an electromagnet or a combination of an electromagnet and one or more magnets—each of which can be configured to decrease the magnetic flux along a predetermined direction.

A variety of configurations can be used to determine the amount or, more particularly, the rate of decrease in the magnetic flux provided by magnetic device 126 along the predetermined direction. For example, in one exemplary embodiment as shown in FIG. 7, the decrease is substantially linear along axial direction A. The rate or slope of this decrease can be matched to the absolute value of the slope of line 127 in FIG. 8. In another embodiment, for example, the rate of decrease could be calculated as Rate of decrease=($\Delta T$/stage 152)−($\Delta T$/stage 162)/($NT$/stage 152)  Eqn 1:

Other methods may be used for calculating the rate of decrease as well. In addition, the rate of decrease can also include e.g. a non-linear rate of decrease.

By decreasing the magnetic flux provided by magnetic element 126 as described above, the amount of work associated with cycling working units 112 through the magnetic field can be decreased—resulting in more efficiency in the operation of heat pump 100. In addition, where magnetic element 126 is constructed from one or more magnets, the cost of manufacturing heat pump 100 and, therefore, appliance 10 can be substantially reduced.

Returning to FIGS. 4, 5, and 6, for this exemplary embodiment magnetic element 126 is constructed in the shape of an arc from a plurality of magnets 130 arranged in a Halbach array. More specifically, magnets 130 are arranged so that magnetic device 126 provides a magnetic field M located radially outward of magnetic device 126 and towards regenerator housing 102 while minimal or no magnetic field is located radially-inward towards the axis of rotation A-A, Magnetic field M may be aligned in a curve or arc shape. In addition, the thickness T of magnetic element decreases along a predetermined direction—axial direction A-A in this example—as also shown in FIG. 4.

A variety of other configurations may be used as well for magnetic device 126 and/or its resulting magnetic field. For example, magnetic device 126 could be constructed from a first plurality of magnets positioned in cavity 128 in a Halbach array that directs the field outwardly while a second plurality of magnets is positioned radially outward of regenerator housing 102 and arranged to provide a magnetic field that is located radially inward to the regenerator housing 102. In still another embodiment, magnetic device 126 could be constructed from a plurality of magnets positioned radially outward of regenerator housing 102 and arranged to provide a magnetic field that is located radially inward towards the regenerator housing 102. Other configurations of magnetic device 126 may be provided as well. For example, coils instead of magnets may be used to create the magnetic field desired.

For this exemplary embodiment, the arc created by magnetic device 126 provides a magnetic field extending circumferentially about 180 degrees. In still another embodiment, the arc created by magnetic device 128 provides a magnetic field extending circumferentially in a range of about 170 degrees to about 190 degrees.

A motor 28 is in mechanical communication with regenerator housing 102 and provides for rotation of housing 102 about axis A-A. By way of example, motor 28 may be connected directly with housing 102 by a shaft or indirectly through a gear box. Other configurations may be used as well.

In the description above, normal MCM was used to describe the operation of heat pump 100. As will be understood by one of skill in the art using the teachings disclosed herein, inverse MCMs could also be used as well. The direction of flow of fluid through heat pump 100 would be reversed, accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump system for use with a heat transfer fluid, comprising:

a regenerator housing defining a circumferential direction and rotatable about an axial direction, the axial direction extending along a direction of flow of the heat transfer fluid between a first end and a second end of the regenerator housing, the regenerator housing comprising a plurality of chambers with each chamber extending along the axial direction between a pair of openings, the plurality of chambers arranged proximate to each other along the circumferential direction;

a plurality of working units, each working unit positioned within one of the plurality of chambers and extending along the axial direction, each working unit comprising a plurality of stages arranged adjacent to each other along the axial direction, wherein each stage comprises magneto caloric material having a Curie temperature range, the plurality of stages arranged so that the Curie temperature ranges of the plurality of stages increase along the axial direction, and wherein the Curie temperature ranges of the plurality of stages overlap between stages that are adjacent to each other along the axial direction;

a magnetic device comprising one or more magnets having a thickness along a radial direction defined by the regenerator housing, the thickness of the one or more magnets decreasing along the axial direction, the magnetic device positioned proximate to the regenerator housing and extending along the axial direction, the magnetic device creating a field of magnetic flux, the magnetic device positioned so that one or more of the plurality of working units are moved in and out of the magnetic field as the regenerator housing is rotated about the axial direction;

a pair of rotatable plates comprising a first rotatable plate attached to the first end of the regenerator housing and a second rotatable plate attached to the second end of the regenerator housing, the first and second rotatable plates each comprising a respective plurality of apertures spaced apart from each other along the circumferential direction with each aperture of the respective plurality of apertures positioned adjacent to one of the pair of openings of one of the plurality of chambers so as to provide fluid communication;

a pair of fixed plates comprising a first fixed plate positioned proximate to the first rotatable plate and a second fixed plate positioned proximate to the second rotatable plate such that the regenerator housing and the pair of rotatable plates are rotatable relative to the pair of fixed plates, the first fixed plate and the second fixed plate each comprising a plurality of ports including one or more pairs of the plurality of ports positioned in an opposing manner relative to each other and also positioned so that each port of the plurality of ports can selectively align with at least one of the pair of openings of the plurality of chambers to provide fluid communication as the regenerator housing is rotated about the axial direction; and a pair of gaskets comprising a first gasket positioned between the first fixed plate and the first rotatable plate and a second gasket positioned between the second fixed plate and the second rotatable plate, the pair of gaskets configured for providing fluid seals between the pair of rotatable plates and the pair of non-rotatable plates.

2. The heat pump system of claim 1, wherein the regenerator housing defines a radial direction and further comprises a cavity positioned radially-inward of the plurality of chambers, wherein the magnetic device is positioned within the cavity of the regenerator housing.

3. The heat pump system of claim 1, wherein the magnetic device wherein the one or more magnets comprises a plurality of magnets arranged in the shape of an arc and configured to project a magnetic field that is in a direction substantially along a radially-outward direction.

4. The heat pump system of claim 3, wherein the plurality of magnets are arranged in a HalBach array.

5. The heat pump system of claim 1, wherein the magnetic flux created by the magnetic device decreases in a linear manner, within known error rates for measuring magnetic flux, along the axial direction.

6. The heat pump system of claim 5, wherein a rate of decrease of the magnetic flux of the magnetic field along the axial direction is equal, within known error rates for measuring magnetic flux, to an absolute value of a rate of increase in a plurality of Curie temperature ranges of the plurality of stages along the axial direction.

7. The heat pump system of claim 1, wherein the magnetic device comprises an electromagnet.

8. The heat pump system of claim 1, wherein the first and second rotatable plates each comprise a plurality of projections extending along the axial direction and received into a plurality of channels defined by the pair of gaskets, wherein the plurality of projections define the respective plurality of apertures of the first and second rotatable plates for fluid flow.

9. The heat pump system of claim 8, wherein the respective plurality of apertures of the first and second rotatable plates are aligned with the respective plurality of apertures of the pair of gaskets so as to provide fluid communication therebetween.

10. The heat pump system of claim 1, wherein the pair of gaskets each comprise a pliable material.

11. The heat pump system of claim 10, wherein the pair of gaskets each comprise an elastomeric material.

12. A heat pump system for use with a heat transfer fluid, comprising:

a regenerator housing defining a circumferential direction and rotatable about an axial direction, the axial direction extending along a direction of flow of the heat transfer fluid between a first end and a second end of the regenerator housing, the regenerator housing comprising a plurality of chambers with each chamber extending along the axial direction between a pair of openings, the plurality of chambers arranged proximate to each other along the circumferential direction;

a plurality of working units, each working unit positioned within one of the plurality of chambers and extending along the axial direction, each working unit comprising a plurality of stages arranged adjacent to each other along the axial direction, wherein each stage comprises magneto caloric material having a Curie temperature range, the plurality of stages arranged so that the Curie temperature ranges of the plurality of stages increase along the axial direction, and wherein the Curie temperature ranges of the plurality of stages overlap between stages that are adjacent to each other along the axial direction;

a magnetic device positioned proximate to the regenerator housing and extending along the axial direction, the magnetic device creating a field of magnetic flux, the magnetic device positioned so that one or more of the plurality of working units are moved in and out of the magnetic field as the regenerator housing is rotated about the axial direction, wherein the magnetic device creates a magnetic field of decreasing magnetic flux along the axial direction as the Curie temperature ranges of the plurality of stages increase along the axial direction;

a pair of rotatable plates comprising a first rotatable plate attached to the first end of the regenerator housing and a second rotatable plate attached to the second end of the regenerator housing, the first and second rotatable plates each comprising a plurality of apertures spaced apart from each other along the circumferential direction with each aperture positioned adjacent to one of the pair of openings of one of the plurality of chambers so as to provide fluid communication;

a pair of fixed plates comprising a first fixed plate positioned proximate to the first rotatable plate and a second fixed plate positioned proximate to the second rotatable plate such that the regenerator housing and the pair of rotatable plates are rotatable relative to the pair of fixed plates, the first fixed plate and the second fixed plate each comprising a plurality of ports including one or more pairs of the plurality of ports positioned in an opposing manner relative to each other and also positioned so that each port of the plurality of ports can selectively align with at least one of the pair of openings of the plurality of chambers to provide fluid communication as the regenerator housing is rotated about the axial direction; and a pair of gaskets comprising a first gasket positioned between the first fixed plate and the first rotatable plate and a second gasket positioned between the second fixed plate and the second rotatable plate, the pair of gaskets configured for providing fluid seals between the pair of rotatable plates and the pair of non-rotatable plates.

13. The heat pump system of claim 12, wherein the magnetic flux created by the magnetic device decreases in a linear manner along the axial direction.

14. The heat pump system of claim 12, wherein the pair of gaskets comprise one or more coatings applied to the pair of rotatable plates.

15. A heat pump for heating and cooling a heat transfer fluid, comprising:
  a regenerator housing defining a circumferential direction and rotatable about an axial direction, the axial direction extending longitudinally between a first end and a second end of the regenerator housing and parallel to a direction of flow of the heat transfer fluid through the regenerator housing, the regenerator having one or more openings for fluid flow at each end of the housing;
  a plurality of working units positioned within the regenerator housing and extending along the axial direction, the working units positioned adjacent to each other along the circumferential direction, each working unit comprising a plurality of stages arranged sequentially along the axial direction, each stage comprising magneto caloric material having a Curie temperature range, the plurality of stages arranged so that the Curie temperature ranges of the plurality of stages increase along the axial direction, and wherein the Curie temperature ranges of the plurality of stages overlap between stages that are adjacent to each other along the axial direction;
  a magnetic device positioned proximate to the regenerator housing and extending along the axial direction, the magnetic device creating a field of magnetic flux, the magnetic device positioned so that one or more of the plurality of working units are moved in and out of the magnetic field as the regenerator housing is rotated about the axial direction, wherein a magnitude of the field of magnetic flux of the magnetic device decreases linearly along the axial direction;
  a pair of rotatable plates comprising a first rotatable plate attached to the first end of the regenerator housing and a second rotatable plate attached to the second end of the regenerator housing, the first and second rotatable plates each comprising a respective plurality of apertures spaced apart from each other along the circumferential direction with each aperture of the respective plurality of apertures positioned adjacent to at least one of the openings at the ends of the regenerator housing so as to provide fluid communication;
  a pair of fixed plates comprising a first fixed plate positioned proximate to the first rotatable plate and a second fixed plate positioned proximate to the second rotatable plate such that the regenerator housing and the pair of rotatable plates are rotatable relative to the pair of fixed plates, the first fixed plate and the second fixed plate each comprising a plurality of ports including one or more pairs of the plurality of ports positioned in an opposing manner relative to each other and also positioned so that each port of the plurality of ports can selectively align with at least one of the openings at the ends of the regenerator housing as it is rotated about the axial direction; and
  a pair of gaskets comprising a first gasket positioned between the first fixed plate and the first rotatable plate and a second gasket positioned between the second fixed plate and the second rotatable plate, the pair of gaskets configured for providing fluid seals between the pair of rotatable plates and the pair of non-rotatable plates.

16. The heat pump for heating and cooling a heat transfer fluid as in claim 15, wherein the first and second rotatable plates each comprise a plurality of projections extending along the axial direction and received into a plurality of channels defined by the pair of gaskets, wherein the plurality of projections define the respective plurality of apertures of the first and second rotatable plates for fluid flow, and wherein the plurality of apertures of the first and second rotatable plates are aligned with the plurality of apertures of the pair of gaskets so as to provide fluid communication therebetween.

17. The heat pump for heating and cooling a heat transfer fluid as in claim 15, wherein the magnetic device comprises a plurality of magnets arranged in the shape of an arc and configured to project a magnetic field that is in a direction substantially along a radially-outward direction.

18. The heat pump for heating and cooling a heat transfer fluid as in claim 15, wherein a rate of decrease of the magnetic flux of the magnetic field along the axial direction is equal, within known error rates for measuring magnetic flux, to an absolute value of a rate of increase in a plurality of Curie temperature ranges of the plurality of stages along the axial direction.

* * * * *